(12) United States Patent
Sundaresan et al.

(10) Patent No.: US 6,606,620 B1
(45) Date of Patent: Aug. 12, 2003

(54) METHOD AND SYSTEM FOR CLASSIFYING SEMI-STRUCTURED DOCUMENTS

(75) Inventors: Neelakantan Sundaresan, San Jose, CA (US); Jeonghee Yi, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 325 days.

(21) Appl. No.: 09/624,616

(22) Filed: Jul. 24, 2000

(51) Int. Cl.$^7$ ............................................... G06F 17/30
(52) U.S. Cl. ...................... 707/3; 707/104.1; 707/500; 370/503
(58) Field of Search ................ 707/3, 5, 104.1, 707/500, 513, 2, 4, 205, 503; 370/503; 382/176, 173, 270; 709/217; 702/180

(56) References Cited

U.S. PATENT DOCUMENTS

| | | | | |
|---|---|---|---|---|
| 5,546,474 A | * | 8/1996 | Zuniga | 382/176 |
| 5,832,480 A | * | 11/1998 | Byrd et al. | 707/5 |
| 5,974,412 A | | 10/1999 | Hazlehurst et al. | 707/3 |
| 6,072,809 A | * | 6/2000 | Agrawal et al. | 370/503 |
| 6,212,532 B1 | * | 4/2001 | Johnson et al. | 707/500 |
| 6,385,619 B1 | * | 5/2002 | Eichstaedt et al. | 707/104.1 |
| 6,389,436 B1 | * | 5/2002 | Chakrabarti et al. | 707/513 |

OTHER PUBLICATIONS

Serge Abiteboul, "Querying Semi–Structured Data," Proc. of the International Conference on Database Theory, pp. 1–18, Delphi, Jan. 1997.

Soumen Chakrabarti, Byron Dom, Rakesh Agrawal, and Prabhakar Raghavan, "Using Taxonomy, Discriminants and Signatures for Navigating in Text Databases," Proc. of the 23$^{rd}$ VLDB Conference, Athens, Greece, 1997.

Soumen Chakraharti. Byron Dom. and Piotr Indyk, "Enhanced Hypertext Categorization Using Hyperlinks," In Proc. of ACM SICMOD Conference, pp. 307–318, Seattle, Washington, 1998.

C. Chekuri, M. Goldwasser, P. Rghavan, and E. Upfal, "Web Search Using Automatic Classification," In Proc. of the 6th International World Wide Web Conference, Santa Clara, California, Apr. 1996.

Andrew McCallum, Kamal Nigam, Jason Rennie, and Kristie Seymore, "Building Domain–Specific Search Engines With Machine Learning Techniques," In AAAI Spring Symposium, 1999.

D.D. Lewis and M. Ringuette, "Comparison of Two Learning Algorithms For Text Categorization," In Proc. of the Third Annual Symposium on Document Analysis and Information Retrieval (SDAIR '94), 1994.

E. Wiener, J. O. Pedersen, and A. S. Weigend, "A Neural Network Approach to Topic Spotting," In Proc. of the Fourth Annual Symposium on Document Analysis and Information Retrieval (SDAIR '95), 1995.

* cited by examiner

*Primary Examiner*—Dov Popovici
*Assistant Examiner*—Hassan Mahmoudi
(74) *Attorney, Agent, or Firm*—Samuel A. Kassatly

(57) ABSTRACT

A classifier for semi-structured documents and associated method dynamically and accurately classify documents with an implicit or explicit schema by taking advantage of the term-frequency and term distribution information inherent in the document. The system uses a structured vector model that allows like terms to be grouped together and dissimilar terms to be segregated based on their frequency and distribution within the sub-vectors of the structure vector, thus achieving context sensitivity. The final decision for assigning the class of a document is based on a mathematical comparison of the similarity of the terms in the structured vector to those of the various class models. The classifier of the present invention is capable of both learning and testing. In the learning phase the classifier develops models for classes with information it develops from the composite information gleaned from numerous training documents. Specifically, it develops a structured vector model for each training document. Then, within a given class of documents it adds and then normalizes the occurrences of terms.

26 Claims, 7 Drawing Sheets

METHOD AND SYSTEM FOR CLASSIFYING SEMI-STRUCTURED DOCUMENTS

FIELD OF THE INVENTION

The present invention relates to the field of automated information retrieval in the context of document characterization and classification. Particularly, the present invention relates to a system and associated method for classifying semi-structured data maintained in systems that are linked together over an associated network such as the Internet. More specifically, this invention pertains to a computer software product for dynamically categorizing and classifying documents by taking advantage of both textual information as well as latent information embedded in the structure or schema of the documents, in order to classify their contents with a high degree of precision. This invention incorporates a structured vector model, and relies on a document classifier that assumes a structured vector model.

BACKGROUND OF THE INVENTION

The World Wide Web (WWW) is comprised of an expansive network of interconnected computers upon which businesses, governments, groups, and individuals throughout the world maintain inter-linked computer files known as web pages. The phenomenal growth of the WWW has led to the proliferation of data in semi-structured formats such as HTML and XML. There is a pressing need to support efficient and effective information retrieval, search and filtering. An accurate classifier is an essential component of building a semi-structured database system.

Currently, users navigate Web pages by means of computer software programs/search tools that commonly fall into two broad categories: net directories and search engines. Net directories provide a hierarchical classification of documents based on a manual classification of Web page materials and data. Search engines use a keyword-based search methodology to return to the user a set of pages that contain a given keyword or words. Both search tools suffer from significant limitations. Net directories are precise but are very limited in scope and expensive to maintain, primarily because of the requirement for human effort to build and maintain them. Search engines are more capable of covering the expanse of the Web but suffer from low precision and in their current embodiments, are reaching their logical limits. Search engines may provide to the user a null return or, conversely, a multitude of responses, the majority of which are irrelevant.

A number of techniques have been applied to the problem. Among them: statistical decision theory, machine learning, and data mining. Probabilistic classifiers use the joint probabilities of words and categories to estimate the probability of a document falling in a given category. These are the so-called term-based classifiers. Neural networks have been applied to text categorization. Decision tree algorithms have been adapted for data mining purposes.

The problems associated with automated document classification are manifold. The nuances and ambiguity inherent in language contribute greatly to the lack of precision in searches and difficulty of achieving successful automated classification of documents. For example, it is quite easy for an English-speaking individual to differentiate between the meanings of the word "course" in the phrase "golf course" and the phrase "of course." A pure, term-based classifier, incapable of interpreting contextual meaning, would wrongly lump the words into the same category and reach a flawed conclusion about a document that contained the two phrases. Another difficulty facing automatic classifiers is the fact that all terms are not equal from a class standpoint.

Certain terms are good discriminators because they occur significantly more in one class than another. Other terms must be considered noise because they occur in all classes almost indifferently. The effective classifier must be able to effectively differentiate good discriminators from noise. Yet another difficulty for classifiers is the evaluation of document structure and relative importance of sections within the document. As an example, for a classifier dealing with resumes, sections on education and job skills would need to be recognized as being more important than hobbies or personal background.

These and other language problems represent difficulties for automated classification of documents of any type, but the World Wide Web introduces its own set of problems as well. Among these problems are the following:

---

1. Web documents are extremely diverse in content, structure, style and format, partly because of their diverse authorship. Many of the techniques that have been developed are only effective on documents with homogeneous corpora.
2. A significant fraction of Web documents are hypertext documents, often divided into pages that are connected by hyperlinks. Documents used for most existing Information Retrieval (IR) studies are self-contained and cannot deal with the links.
3. Most popular web document formats such as HTML or XML are semi-structured, implying either an explicit or implicit, though not fixed, schema. Previous Information Retrieval (IR) efforts have focused on flat (unstructured) documents. The markups and formatting cues in the document can mislead the classifiers; removing or ignoring them means that only part of the original information is available for classification.

---

The challenges, then, are to deal with the problems inherent in all documents but to also deal with the special problems associated with Web documents, in particular those with a semi-structured format.

As noted, semi-structured data are data that do not have a fixed schema. Semi-structured data, however, have a schema, either implicit or explicit, but do not have to conform to a fixed schema. By extension, semi-structure documents are text files that contain semi-structured data. Examples include documents in HTML and XML and, thus, represent a large fraction of the documents on the Web.

The exploitation of the features inherent in such documents is a key to attaining and obtaining better information retrieval is not new. For example, one classifier has been designed to specifically take advantage of the hyperlinks available in HTML. Reference is made to Soumen Chakrabarti, et al., "Enhanced Hypertext Categorization Using Hyperlinks," Proc. of ACM SIGMOD Conference, pages 307–318, Seattle, Wash., 1998.

In this manner, the classifier can evaluate for both and non-local data information to better categorize a document. However, there are more features of semi-structured documents that can be used for classification along with new techniques for evaluating the information gleaned from the documents.

Currently, there exists no other classifier that takes full advantage of the information available in semi-structured documents to produce accurate classification of such documents residing on the World Wide Web. The need for such a classifier has heretofore remained unsatisfied.

SUMMARY OF THE INVENTION

The text classifier for semi-structured documents and associated method of the present invention satisfy this need.

In accordance with one embodiment, the system can dynamically and accurately classify documents with an implicit or explicit schema by taking advantage of the term-frequency and term distribution information inherent in the document. The system further uses a structured vector model that allows like terms to be grouped together and dissimilar terms to be segregated based on their frequency and distribution within the sub-vectors of the structure vector, thus achieving context sensitivity. The final decision for assigning the class of a document is based on a mathematical comparison of the similarity of the terms in the structured vector to those of the various class models.

The classifier of the present invention is capable of both learning and testing. In the learning phase the classifier develops models for classes with information it develops from the composite information gleaned from numerous training documents. Specifically, it develops a structured vector model for each training document. Then, within a given class of documents it adds and then normalizes the occurrences of terms.

The classifier further employs a feature selection technique to differentiate between good discriminators and noise and to discard noise terms on the basis of the structure the terms appear. It additionally employs a feature selection technique that determines the relative importance of sections of textual information. Once models for classes have been developed, the classifier can be used on previously unseen documents to assign best matching classes by employing a robust statistical algorithm.

To fully appreciate the characteristics and capabilities of the classifier it is first important to understand the basic characteristics of an XML (or other semi-structured) document and, further, to understand the concept of the extended model required to exploit the information encoded in them. XML documents differ from typical text documents in the following respects:

1. Each element of an XML document is tagged.
2. The tags are usually nested, making the XML documents hierarchical in nature.
3. Any element of an XML document can be referred to by any other element, thus requiring the documents to be modeled as directed graphs. Under some circumstances, a special case of a directed graph, a tree, can be used, particularly for purposes of exposition.

Proper classification of XML documents, thus, requires a scheme that exploits the rich information encoded in their structure. It is necessary to extend the notion of a document to incorporate the hierarchical sectioning of text. In an extended model, a document is hierarchically structured and text is embedded in the structure.

The hierarchical structure can be understood in the context of the analogy to a book. A book consists of many chapters, which, in turn, consist of many sections formed of many sentences, which, in turn, consist of many words. A word belongs to a sentence that contains the word, thus to the section that contains the sentence, the chapter that contains the section and, ultimately, to the book at its highest level. Thus, in a structured document a term (or equivalently a leaf or text) belongs to its antecedents. In the parlance of graph theory, the leaf belongs to its parent, its grandparent and all higher ancestors, ultimately belonging to the document or root.

The structure of the model is based on the following observation: Terms from the same XML element have to be grouped together to be treated in the same way, and to be differentiated from terms in other XML elements. The primary reason is that terms in one substructure may have a distribution that is different from another substructure or different distribution of terms from the overall document. By taking into account the structural information the classifier can achieve a context sensitivity that flat (unstructured) document models cannot achieve.

The algorithm used by the classifier may be summarized by the following process:

1. For each term, augment the term by the tags of the elements at various levels of the paths.
2. Compute the F score of each augmented term. The F score measures the term's ability to separate classis as a ration of inter-class to intra-class variation.
3. Order the terms by decreasing order of F score and pick the first k terms from the sequence of terms from each structure (i.e., the terms with same prefix after term augmentation). K is a given threshold.
4. Select document structure elements of which the average F value of terms is greater than the given threshold q.
5. For classification of semi-structured documents, the class is chosen that has the most similar terms distribution to the term distribution of the test document. The term distribution is the distribution of augmented terms.

The semi-structured document classifier of the present invention provides several features and advantages, among which are the following:

1. It generates and uses a structure known as a structured vector model that contains sub-vectors corresponding to the elements within the document.
2. Unlike previous classifiers, a term is treated differently if it belongs to a different sub-vector. Terms belonging to a different sub-vector are treated differently, receiving different weightings. Thus, it achieves a context sensitivity that leads to significant improvements over text-based classifiers.
3. It takes into account the term frequency and distribution within a document as a whole but also within the sub-structures of the document.
4. It is able to utilize information latent in document structures.
5. It considers the document as a tree with a hierarchy of terms rather than a simple collection of terms.
6. It uses a process known as tag augmentation to encode the tagging and nesting of elements in a semi-structured document. It explicitly groups like structure elements of terms together and, further, segregates dissimilar terms.
7. It bases its final decision on the topics of the document on both the term frequency and term distribution information and structure of the document as described above.
8. It achieves the benefits enumerated for a structured model and the speed of a flat vector model by taking advantage of the equivalence of tag augmentation and the structured vector model.
9. It incorporates context-sensitive term selection in its learning algorithm in the context of document structure. Term selection is performed for each sub-structure of document. That is, it differentiates between significant terms and noise per structure basis instead of the entire document.
10. It relies on a well-defined, robust probability function to make a final determination the class of a document. The classifier is the first to incorporate both textual and structural features into the statistical model or class determination.

The foregoing and other features and advantages of the present invention are realized by a classifier that takes advantages of the hierarchical nature of documents exemplified by those in XML (extensible Markup Language), or any other language whose structure is hierarchical in nature and includes tags with each element. The classifier presented herein uses the inherent structure of XML or other semi-structured documents to provide high quality semantic clues that may not be otherwise taken advantage of by term-based classification schemes. The classifier further relies on a robust statistical model and a structure-based context-sensitive feature for better classification

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

DETAILED DESCRIPTION OF THE INVENTION

Figure 1:
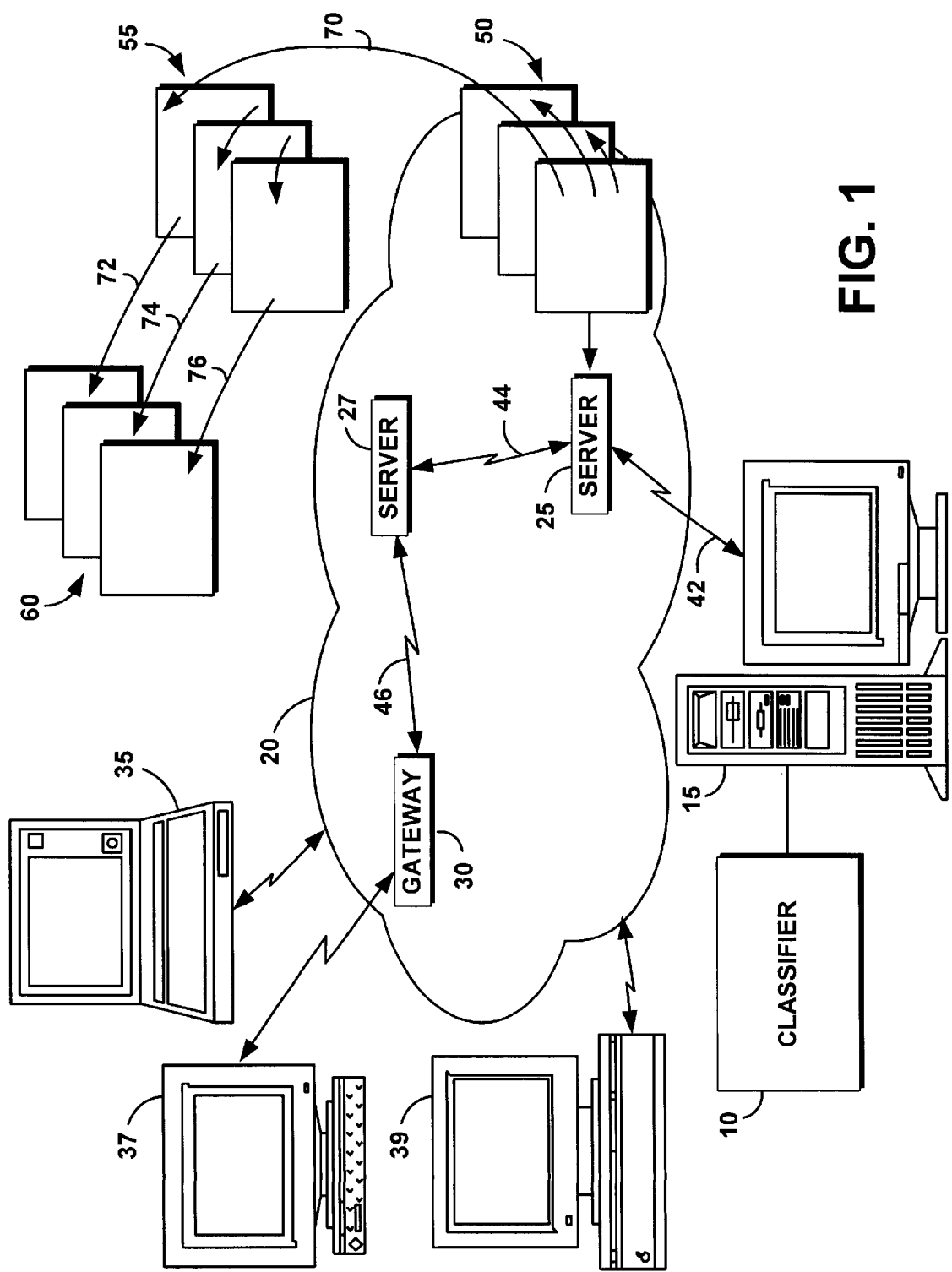
FIG. 1 is a schematic illustration of an exemplary operating environment in which a classifier for semi-structured documents of the present invention can be used.

The following definitions and explanations provide background information pertaining to the technical field of the present invention, and are intended to facilitate the understanding of the present invention without limiting its scope:

Child (also daughter): From graph theory, a node pointed to by a path from a parent DTD (Document Type Definition) defines the schema of semi-structured documents such as SGML(Standard Generalized Markup Language), HTML, or XML documents.

Element: "Tagged" text; text encoded with formatting or other information

Flat: Devoid of structure

Flatten: To remove structure, especially from an entity with implicit tree structure, in order to achieve a simple collection of leaves HTML (Hypertext Markup Language): A standard language for attaching presentation and linking attributes to informational content within documents. During a document authoring stage, HTML "tags" are embedded within the informational content of the document. When the web document (or "HTML document") is subsequently transmitted by a web server to a web browser, the tags are interpreted by the browser and used to parse and display the document. In addition to specifying how the web browser is to display the document, HTML tags can be used to create hyperlinks to other web documents.

Internet: A collection of interconnected public and private computer networks that are linked together with routers by a set of standards protocols to form a global, distributed network.

Leaf: Terminal node of a tree; a node with no child/daughter.

Node: A point or vertex in a graph.

Parent: A node (as in a graph) with a successor (child/daughter).

Root node: A node with no parent but typically with children.

Search engine: A remotely accessible World Wide Web tool that allows users to conduct keyword searches for information on the Internet.

Schema: Format or structure. It defines the structure and type of contents of constituent structures of, for example, a database, XML documents, etc.

Semi-structured: Implying a schema, either explicit or implicit but not conforming to a fixed schema.

Server: A software program or a computer that responds to requests from a web browser by returning ("serving") web documents.

Tags: Codes (as in HTML or XML) that give instructions for formatting or action.

Tree: A hierarchical structure which is made up by nodes. Nodes are connected by edges from one node (parent) to another (child). A single node at apex of the tree is known as the root node, while the terminus of a path in the opposite direction is a leaf.

URL (Uniform Resource Locator): A unique address that fully specifies the location of a content object on the Internet. The general format of a URL is protocol://server-address/path/filename.

Vector: Broadly, a collection of objects or terms

Web browser: A software program that allows users to request and read hypertext documents. The browser gives some means of viewing the contents of web documents and of navigating from one document to another.

Web document or page: A collection of data available on the World Wide Web and identified by a URL. In the simplest, most common case, a web page is a file written in HTML and stored on a web server. It is possible for the server to generate pages dynamically in response to a request from the user. A web page can be in any format that the browser or a helper application can display. The format is transmitted as part of the headers of the response as a MIME type, e.g. "text/html", "image/gif". An HTML web page will typically refer to other web pages and Internet resources by including hypertext links.

Web Site: A database or other collection of inter-linked hypertext documents ("web documents" or "web pages") and associated data entities, which is accessible via a computer network, and which forms part of a larger, distributed informational system such as the WWW. In general, a web site corresponds to a particular Internet domain name, and includes the content of a particular organization. Other types of web sites may include, for example, a hypertext database of a corporate "intranet" (i.e., an internal network which uses standard Internet protocols), or a site of a hypertext system that uses document retrieval protocols other than those of the WWW.

World Wide Web (WWW, also Web): An Internet client—server hypertext distributed information retrieval system.

XML: extensible Markup Language. A standard, semi-structured language used for Web documents. During a document authoring stage, XML "tags" are embedded within the informational content of the document. When the web document (or "XML document") is subsequently transmitted by a web server to a web browser, the tags are interpreted by the browser and used to parse and display the document. In addition to specifying how the web browser is to display the document, XML tags can be used to create hyperlinks to other web documents.

FIG. 1 portrays the overall environment in which a classifier (classification system) 10 for semi-structured documents according to the present invention may be used. The classifier 10 includes a software or computer program product which is typically embedded within, or installed on a host server 15. Alternatively, the classifier 10 can be saved on a suitable storage medium such as a diskette, a CD, a hard drive, or like devices. While the classifier 10 will be described in connection with the WWW, the classifier 10 can be used with a stand-alone database of terms that may have been derived from the WWW and/or other sources.

The cloud-like communication network 20 is comprised of communication lines and switches connecting servers such as servers 25, 27, to gateways such as gateway 30. The servers 25, 27 and the gateway 30 provide the communication access to the WWW Internet. Users, such as remote Internet users are represented by a variety of computers such as computers 35, 37, 39, and can query the host server 15 for the desired information.

The host server 15 is connected to the network 20 via a communications link such as a telephone, cable, or satellite link. The servers 25, 27 can be connected via high speed Internet network lines 44, 46 to other computers and gateways. The servers 25, 27 provide access to stored information such as hypertext or web documents indicated generally at 50, 55, and 60. The hypertext documents 50, 55, 60 most likely include embedded hypertext link to other locally stored pages, and hypertext links 70, 72, 74, 76 to other webs sites or documents 55, 60 that are stored by various web servers such as the server 27.

Figure 2:
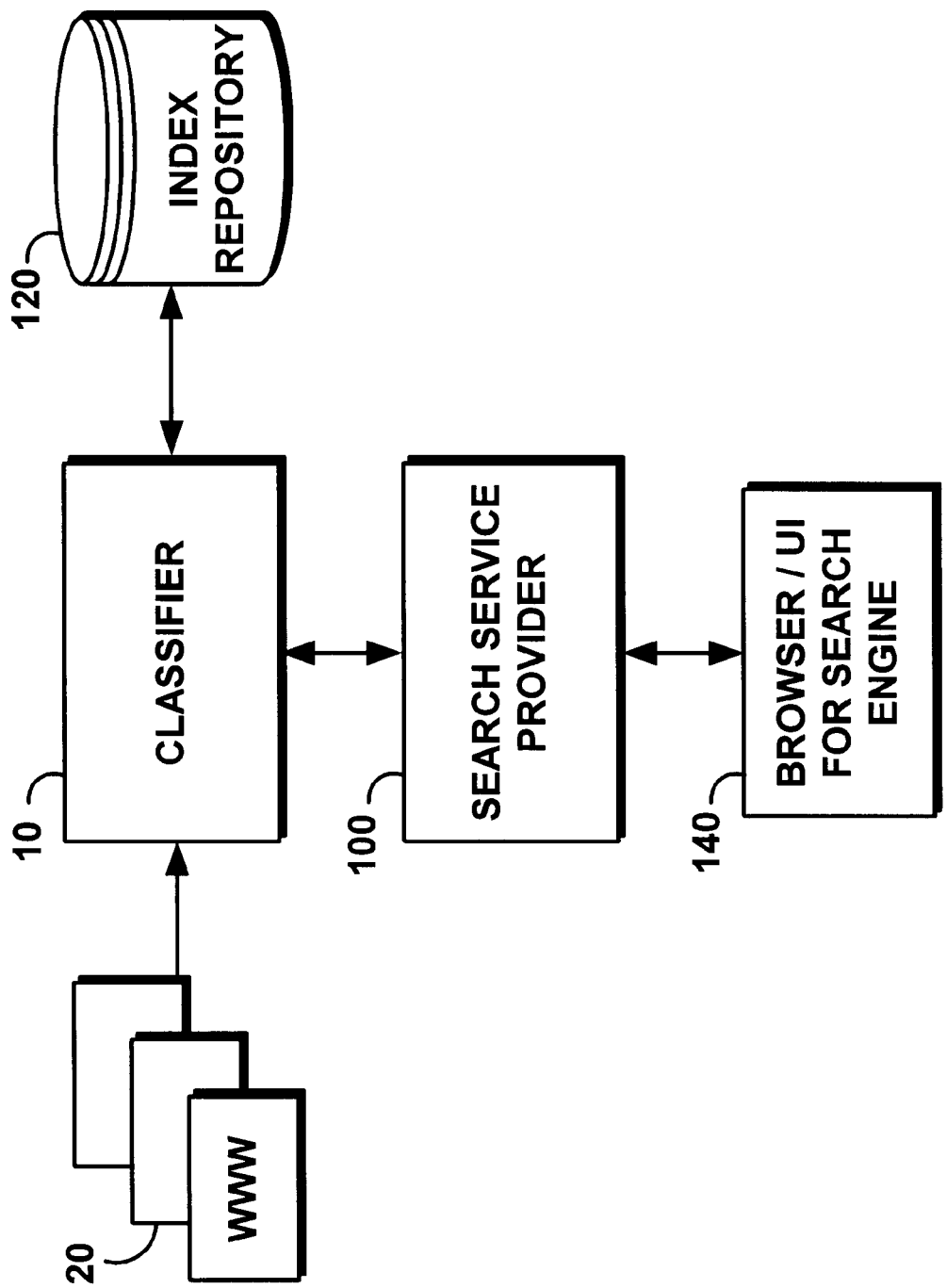
FIG. 2 is a block diagram that illustrates a high level architecture of the system of FIG. 1 shown used in the context of an Internet search.

FIG. 2 illustrates a high-level architecture showing the classifier 10 used in the context of an Internet environment. The classifier 10 resides between the user and the semi-structured documents available for search on the WWW 20. Documents judged to fall into a given category by the classifier will be made available to the user for their perusal and possible use.

As a specific example, a user uses a browser or a user interface (UI) 140 to enter a search query that is transmitted to a search service provider 100. In turn, the search service provider 100, accesses the classifier 10. The classifier automatically searches the semi-structured documents on the WWW 20. The search results will be sent to the user via the search service provider 100. The search results may include a list of URLs and associated brief abstracts describing the nature of the resources found.

A conventional document classification system will now be described in more detail with further reference to FIG. 3. A document may be considered a collection of words or terms. From a classification standpoint, certain terms are considered to be significant and comprise by a vector that contains a component/dimension for each significant term. These are represented by bins W1 through Wn in FIG. 3. In this exemplary case, bin W1 contains the number 12, indicating that the term associated with bin W1 appeared 12 times in the document. Similarly, the term associated with bin W4 failed to appear in the document. The information available from the vector may be also represented by a histogram.

In a classification exercise, the classifier searches the text of a document. The number in each bin indicates the number of occurrences of a particular word in that document. This vector, because of its lack of structure, is indifferent to the meaning or context of the word. Reciting a previous example, the word "course" in the phases "golf course" and "of course" would not be segregated nor differentiated despite differences in meaning and context.

Figures 3, 4:
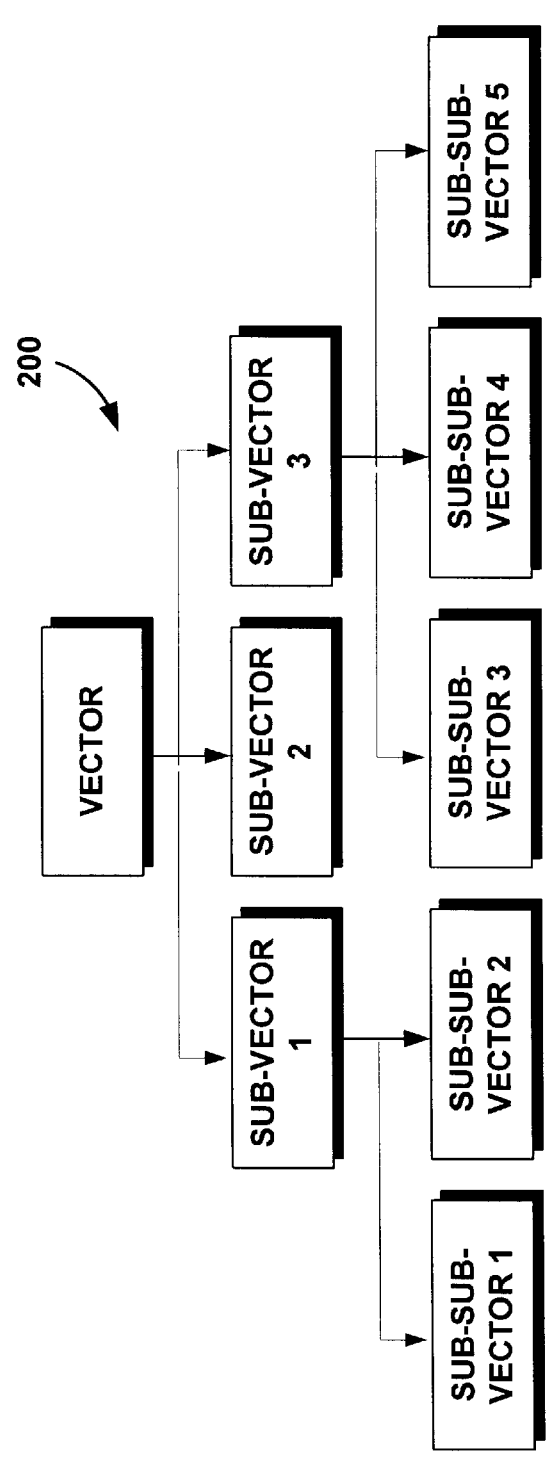
FIG. 3 is an illustration of a non-structured vector used by a conventional classifier.
FIG. 4 is a structured vector model of the present invention used in the classifier of FIG. 2.

With reference to FIG. 4, the classifier 10 for semi-structured documents creates and relies on a structured vector model 200 that allows the classifier 10 to exploit structured information with text content embedded between the structural markups of XML documents. In FIG. 4, a hierarchical document is represented by a structured vector. The vector developed by the classifier 10 is divided into a tree of sub-vectors, labeled as 1, 2 and 3. It should be noted that the tree structure is chosen for simplicity of exposition, though, in general, the documents can be modeled with directed graphs. The sub-vectors may be subdivided into a plurality of sub-sub-vectors, labeled 1, 2, 3, 4, and 5. Hierarchical levels continue downward until the leaves (childless elements) are reached. In XML documents, leaves correspond to pure text. By creating such a model, the classifier 10 is able to encode all of the structural and textual embedded in a document.

The vector of the structured vector model 200 of the present invention includes the sub-vectors of the children elements. By extension, a sub-vector includes the sub-sub-vectors of its children elements.

With a document 300 (FIG. 5) now parsed into the structured vector model 200, the classifier is able to take into account the term frequency and distribution at each hierarchical level and, thus, achieve a contextual sensitivity heretofore unavailable.

The document 300 represented by the structured vector 200 of FIG. 4 may be alternatively represented by a vector using mathematical notation. Specifically, the document of FIG. 4 may be written as a compilation of all the sub-vectors:

$$e_d(0,0) = <e_d(1,0), e_d(1,1), \ldots, e_d(1, m_d(i))>,$$

illustrating the fact that any vector includes the vectors of its child elements.

A path to an interior node $e_d(i,j)$, $pd(i,j) = (e_d(0,0), e_d(1, P_1), e_d(2, p_2) \ldots e_d(i,j))$ is a sequence of structure nodes that must be visited to reach to the node $e_{i,j}$ from the root. The path from the root to the node $e_d(i,j)$ is unique, as each node has only one parent node. Thus, $p_d(i,j)$ uniquely determines the location of the corresponding element's location in the document.

The path expression of each text term in the XML document can be computed by augmenting the tags of the structure elements it belongs to. For example, the term "course" in the education element in the following XML document yields "resume.education.course", and the one in the hobby element yields "resume.hobby.course". Terms in the same element share the same path, whereas the same term in different elements have different paths. Thus, it is possible to consider two terms as having different meanings while they have similar spelling.

Figure 5:
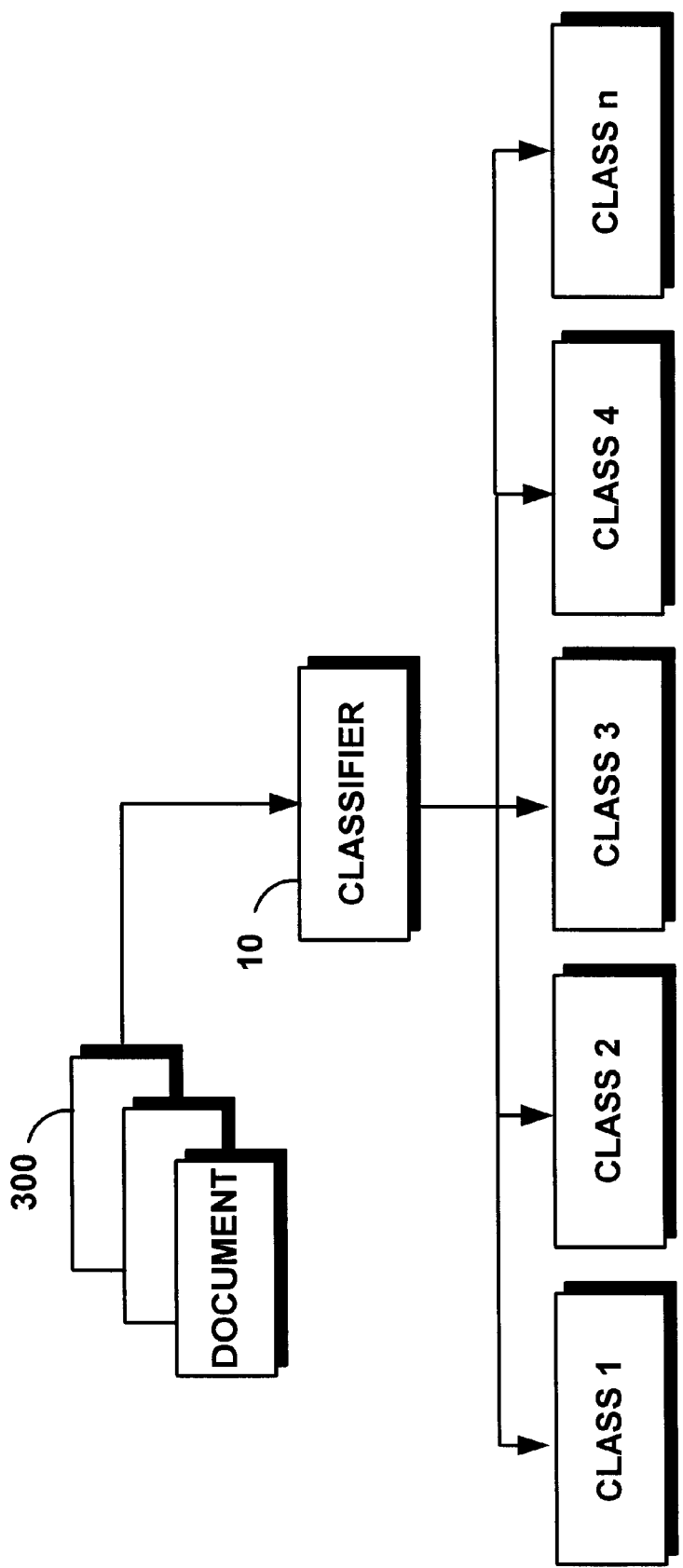
FIG. 5 depicts the classifier using a classification algorithm based on the structured vector model of FIG. 4.

FIG. 5 depicts the classifier 10 and the classification process based on the structured vector model 200 of the present invention. As illustrated, a document 300 is presented to the classifier 10 in order to determine its class. Referring back to FIG. 4, the structural and textual information in the document 300 is used to form the structure vector model 200 of the document. The classifier 10 is now able to characterize the term frequency and distribution of the document in question and compare it to that of the known classes of documents, labeled Class 1 through Class N, in FIG. 5.

Compared to the conventional classifier (FIG. 2) the classifier 10 of the present invention extends beyond the uppermost level of the tree of FIG. 4. The classifier 10 is able to gain added precision by continuing its analysis on the sub-vectors and sub-sub-vectors (and further sub-levels until it reaches the level that comprises only text terms) of the structured vector model 200. In addition, the classifier 10 weights the significance of terms in the sub-vectors and sub-sub-vectors.

Figure 6:
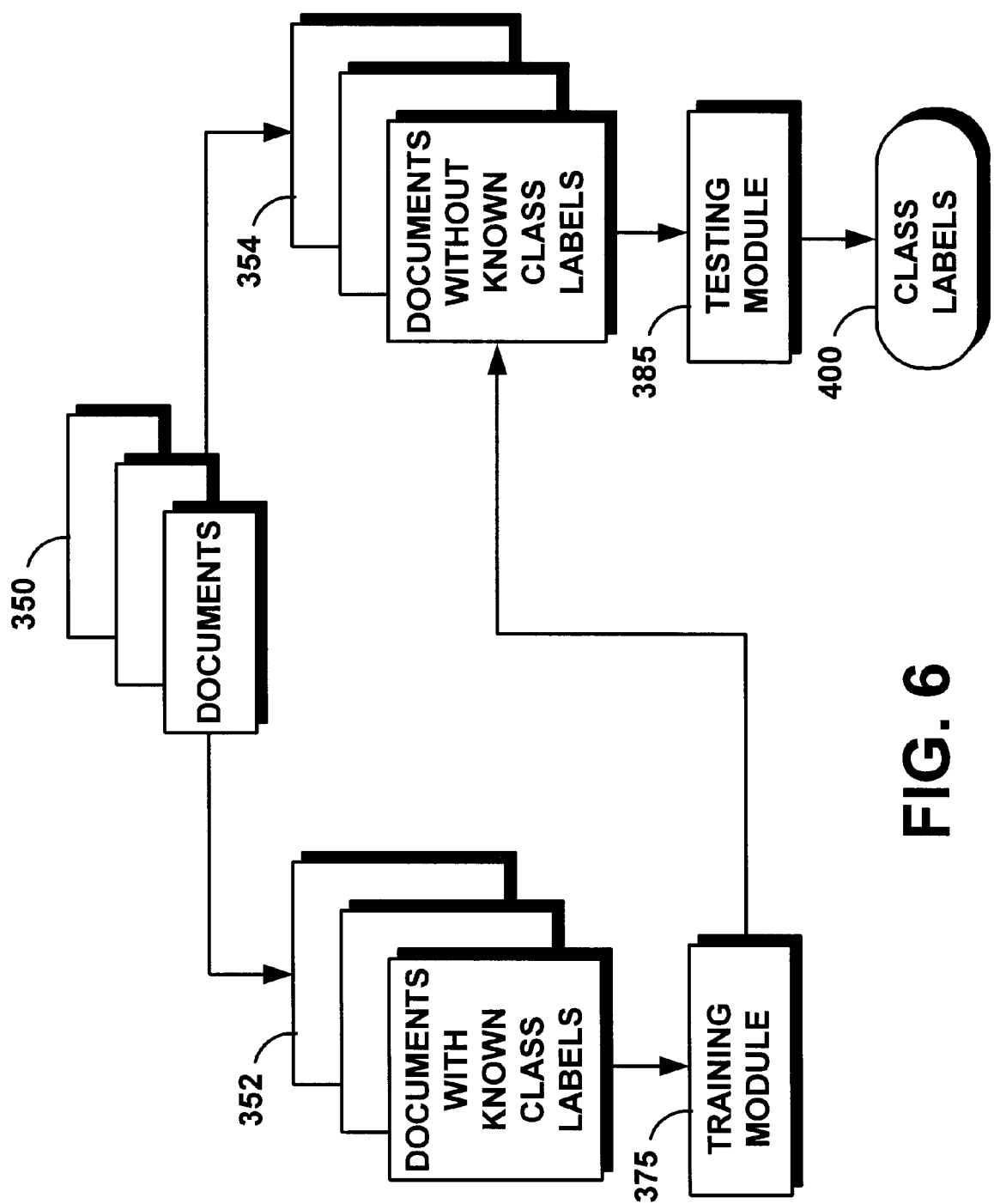
FIG. 6 is block diagram illustrating the training and testing phases for use by the classification algorithm of FIG. 5.

FIG. 6 is a representation of the training and testing phases used by the classifier 10. In order for the classifier 10 to work optimally, it needs to be "trained" to recognize documents of a given class. As illustrated, the classifier 10 is given a large number of documents 350. Some of these documents 352 have known class labels, and other documents 354 are without class labels. Those documents 352 with known class labels are fed into a training module 375 so that the classifier 10 learns the term frequency and distribution characteristics of the documents 352 of a given class.

Once these data are available, the documents 354 without class labels are entered in a testing module (also referred to herein as classification module) 385 which classifies the documents 354. The classifier 10 attempts to classify the documents based on the data of the training documents. In particular, once the term frequency and distribution data for all levels of the vector are available and weightings have been assigned, the classifier 10 relies on a robust statistical model 200 to assign a class to the specific document 300 to be classified. The class 400 assigned is the one that maximizes the following a posteriori class probability $Pr[c|d, F_k]$:

$$Pr[c|d, F_k] = \frac{\left( \pi(c) \prod_{t \in p_d(i,j), t \in d \cap F_k(e_d(i,j))} f(c, p_d(i,j), t)^{n(d, p_d(i,j), t)} \right)}{\left( \sum_{c'} \pi(c') \prod_{t \in p_d(i,\cdot), t \in d \cap F_k(e_d(i,j))} f(c, p_d(i,j), t)^{n(d, p_d(i,j), t)} \right)}$$

where d is the document, $\pi(c)$ is the prior distribution on the class c; c' is a class in the set of documents; $p_d$ is a path to a structure node $e_d$ from the root; n is the number of occurrences of term t in $p_d$, f is the maximum likelihood estimation; $F_k$ is a set of selected terms; F is the Fisher index defined by the following equation, where $c_1$ and $c_2$ are children of the internal class $c_0$, and $\mu$ is the average number of the occurrence of term t in class c:

$$F(t) = \frac{\sum c_1, c_2 (\mu(c_1, t) - \mu(c_2, t))^2}{\sum_c \frac{1}{|c|} \sum dec(f(t, d, c) - \mu(c, t))^2}$$

Figure 7:
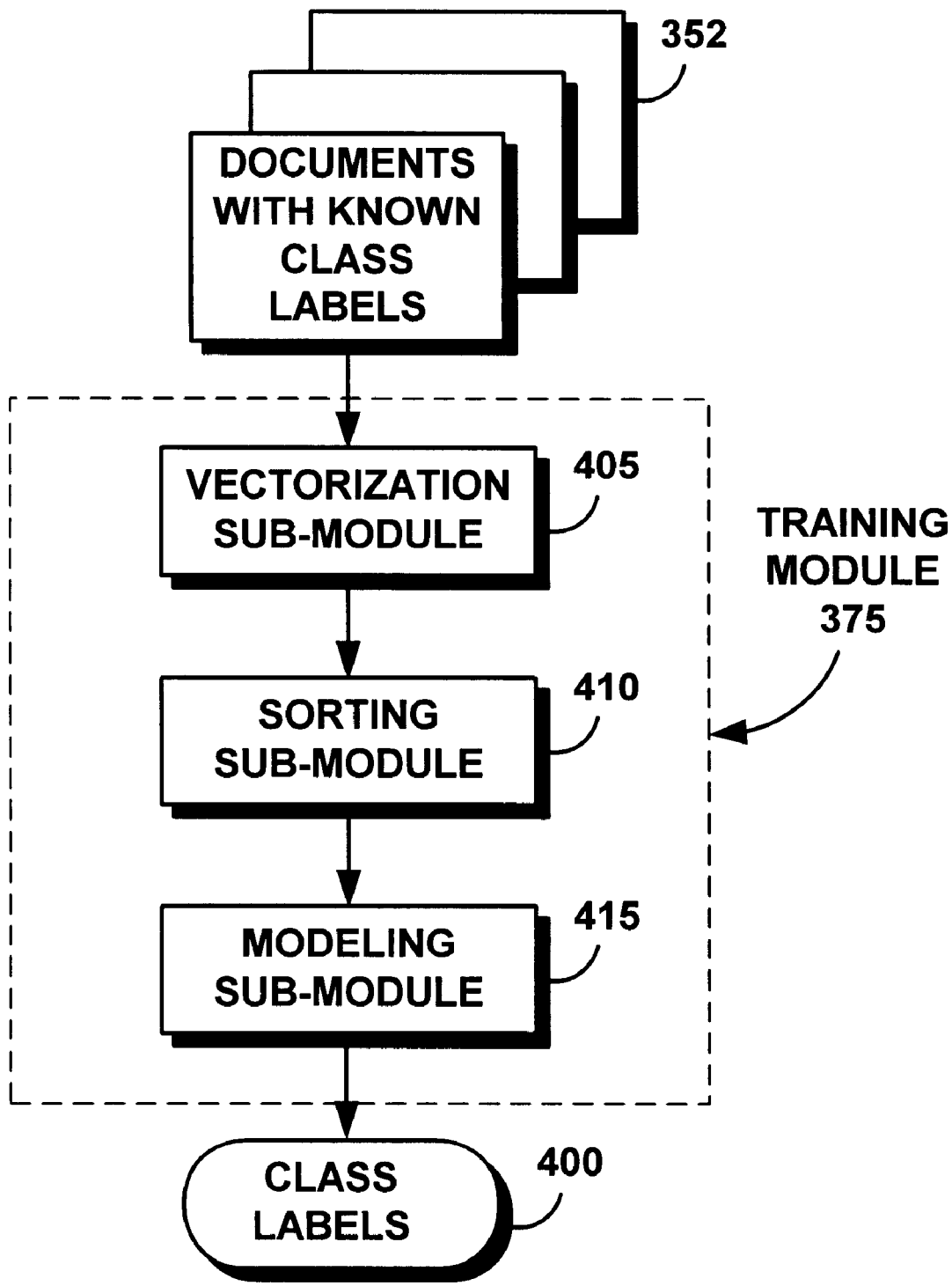
FIG. 7 is a flow chart representing the details of the training phase of FIG. 6, according to the present invention.

FIG. 7 introduces the details of the training module 375 (FIG. 6) of the classifier 10 in the form of a flow chart. Within the training module 375 exist three elements: a vectorization sub-module 405, a sorting sub-module 410, and a modeling sub-module 415. The flexibility of the training module 375 allows the relative locations of the sorting module 410 and the vectorization sub-module 405 to be interchanged. For illustration purpose, the vectorization sub-module 405 and its function will be described first.

With reference to FIG. 7, the training process begins by introducing a large number of documents 352 with known class labels into the classifier 10. For each document 352, the classifier 10 creates a structured vector, in particular, extracting textual and structural information from the document 352 and constructing a directed graph containing the information. This process is known as vectorization.

At each level or sublevel of the structured vector, the classifier 10 calculates the frequency and distribution of terms. The sorting sub-module 410 then sorts the documents 352 by classes, i.e., it classifies the documents 352. At this point, the modeling sub-module 415 is invoked. This sub-module 415 is responsible for gathering the statistical information that will be used to classify documents 354 of unknown class. The statistics are calculated by combining all the documents of a given type together in a meaningful fashion. In particular, the modeling sub-module 415 combines the individual vectors in the class by adding them together and normalizing the result. Term frequencies may be normalized at any level from the uppermost (document level) to the lowest sub-vector.

Modeling may be likened to summation. Each word in the highest-level vector, as in FIG. 4, is assigned a specific bin in a particular order corresponding to the order of the lexicon of the class. The lexicon, thus, defines the order and kinds of words that are used to characterize a document 300. From the vectors of all training documents 352 in a class the sum is calculated. The sum vector is then normalized by the number of documents 352. The process is repeated until a statistical model 200 exists for each class of documents 352. It is upon the basis of these statistical models 200 that classes 400 are assigned to documents 354 of previously undetermined classes.

Figure 8:
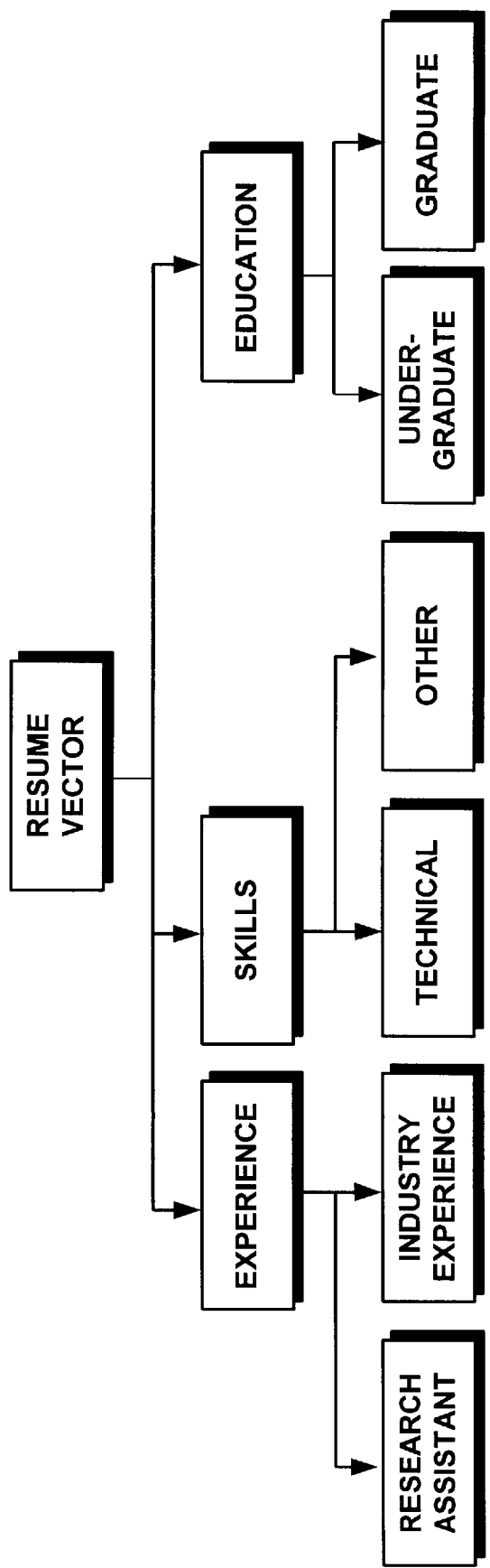
FIG. 8 is a block diagram illustrating a specific example of a vectorization sub-module used in the training phase of FIG. 7.

FIG. 8 provides a specific example of the operation of the vectorization sub-module 405 of FIG. 7 operating on a document 352 with an XML format. For illustrative purposes, a sample document 352 corresponding to the structured vector of FIG. 8, appears below:

```
<resume>
    <experience>
        <research assistant/>
        <industry experience/>
    <experience/>
    <skills>
        <technical/>
        <other/>
    <skills/>
    <education>
        <undergraduate/>
        <graduate>
    <education/>
<resume/>
```

The vectorization sub-module 405 begins its function by parsing the document 352 to crate a parse tree of the document 352. This parser can be an available semi-parser or an XML parser, such as "XML Parser for Java (http://www.alphaworks.ibm.com)." From the parsed tree, the vectorization sub-module 405 continues its function by creating a structured document vector shown in FIG. 8.

The root of the tree is "Resume." Sub-vectors are represented by Experience, Skills and Education. Each of these sub-vectors is underpinned by sub-sub-vectors (or grand-child vectors). As a specific example, Research Assistant and Industry Experience report to the sub-vector Experience. Sub-sub-vectors Technical and Other are children of the sub-vector Skills and grand-children of the vector Resume.

With the document 352 parsed and vectorized, the classifier 10 is now able to process the information contained in the structured vector. It begins by inspecting the terms in the document 352. The first time a term is encountered at the sub or sub-sub-vector level the classifier 10 propagates the occurrence back to the parents of the term and all vectors in that path are updated. In particular, the count on the bin corresponding to that term is incremented. Counts are merged at the higher levels but at the lower levels the counts are separately maintained. The counts that are maintained on the lower levels are the keys to accurate and precise classification of semi-structured documents.

It is to be understood that the specific embodiments of the invention that have been described are merely illustrative of certain application of the principle of the present invention. Numerous modifications may be made to the classifier and associated method described herein without departing from the spirit and scope of the present invention. Moreover, while the present invention is described for illustration purpose only in relation to the WWW, it should be clear that the invention is applicable as well to databases and other tables with indexed entries.

What is claimed is:

1. A classifier, for use on a computer readable medium, for dynamically classifying a semi-structured document with a schema, comprising:
   a vectorization module for parsing the document into a structured vector model, wherein the structured vector model is divided into a tree of sub-vectors to reflect a plurality of hierarchical levels beginning with a root and ending with a plurality of leaves;
   a sorting module for searching the, document and for counting the occurrences of individual terms in the document;
   the sorting module further accounting for the frequency of occurrence of the terms at each hierarchical level to achieve a high contextual sensitivity;
   a testing module for assigning a class to the document by using a statistical model based on probability calculation to create a classification model; and
   wherein the classification model assigns a class to the document that maximizes a posteriori class probability $\Pr[c|d,F_k]$ according to the following expression:

$$\Pr[c|d, F_k] = \frac{\left( \pi(c) \prod_{t \in p_d(i,j), t \in d \cap F_k(e_d(i,j))} f(c, p_d(i, j), t)^{n(d, p_d(i,j), t)} \right)}{\left( \sum_{c'} \pi(c') \prod_{t \in p_d(i,\cdot), t \in d \cap F_k(e_d(i,j))} f(c, p_d(i, j), t)^{n(d, p_d(i,j), t)} \right)}$$

where d is the document, p(c) is a prior distribution on the class c; c' is a class in a set of documents; $p_d$ is a path to a structure node $e_d$ from a root; n is a number of occurrences of term t in $p_d$, f is a maximum likelihood estimation; $F_k$ is a set of selected terms; F is a Fisher index defined by the following equation, where $c_1$ and $c_2$ are children of an internal class $c_0$, and m is an average number of an occurrence of term t in class c:

$$F(t) = \frac{\sum c_1, c_2 (\mu(c_1, t) - \mu(c_2, t))^2}{\sum_c \frac{1}{|c|} \sum_{d \in c} (f(t, d, c) - \mu(c, t))^2}.$$

2. The classifier according to claim 1, wherein the sorting module stores the frequency of occurrence of the terms in separate histogram bins.

3. The classifier according to claim 1, further including a modeling module that uses a statistical model to create a classification model.

4. The classifier according to claim 3, wherein the testing module uses the classification model created by the modeling module to assign the class based on probability calculation.

5. The classifier according to claim 3, wherein the modeling module normalizes the frequency of occurrence of the terms at each hierarchical level.

6. The classifier according to claim 1, wherein the document is an XML document.

7. The classifier according to claim 1, further including a training module for classifying documents with known class labels and for developing structured vector models therefrom.

8. The classifier according to claim 7, wherein the testing module classifies documents with unknown class labels, based on the class label structured vector models developed by the training module.

9. The classifier according to claim 1, wherein the structured vector model uses structured information embedded in the document schema and text content to develop the structured vector model.

10. The classifier according to claim 1, wherein the leaves include textual terms.

11. The classifier according to claim 10, wherein the leaves consist exclusively of textual terms.

12. A software program product for dynamically classifying a semi-structured document with a schema, comprising:
   a vectorization module for parsing the document into a structured vector model, wherein the structured vector model is divided into a tree of sub-vectors to reflect a plurality of hierarchical levels beginning with a root and ending with a plurality of leaves;
   a sorting module for searching the document and for counting the occurrences of individual terms in the document;
   the sorting module further accounting for the frequency of occurrence of the terms at each hierarchical level to achieve a high contextual sensitivity;
   a testing module for assigning a class to the document by using a statistical model based on probability calculation to create a classification model; and
   wherein the classification model assigns a class to the document that maximizes a posteriori class probability $\Pr[c|d,F_k]$ according to the following expression:

$$\Pr[c|d, F_k] = \frac{\left( \pi(c) \prod_{t \in p_d(i,j), t \in d \cap F_k(e_d(i,j))} f(c, p_d(i, j), t)^{n(d, p_d(i,j), t)} \right)}{\left( \sum_{c'} \pi(c') \prod_{t \in p_d(i,\cdot), t \in d \cap F_k(e_d(i,j))} f(c, p_d(i, j), t)^{n(d, p_d(i,j), t)} \right)}$$

where d is the document, p(c) is a prior distribution on the class c; c' is a class in a set of documents; $p_d$ is a path to a structure node $e_d$ from a root; n is a number of occurrences of term t in $p_d$, f is a maximum likelihood estimation; $F_k$ is a set of selected terms; F is a Fisher index defined by the following equation, where $c_1$ and $c_2$ are children of an internal class $c_0$, and m is an average number of an occurrence of term t in class c:

$$F(t) = \frac{\sum_{c_1,c_2}(\mu(c_1, t) - \mu(c_2, t))^2}{\sum_c \frac{1}{|c|}\sum_{d \in c}(f(t, d, c) - \mu(c, t))^2}.$$

13. The software program product according to claim 12, wherein the sorting module stores the frequency of occurrence of the terms in separate histogram bins.

14. The software program product according to claim 12, further including a modeling module that uses a statistical model to create a classification model.

15. The software program product according to claim 14, wherein the testing module uses the classification model created by the modeling module to assign the class based on probability calculation.

16. The software program product according to claim 14, wherein the modeling module normalizes the frequency of occurrence of the terms at each hierarchical level.

17. The software program product according to claim 12, wherein the document is an XML document.

18. The software program product according to claim 12, further including a training module for classifying documents with known class labels and for developing structured vector models therefrom.

19. The software program product according to claim 18, wherein the testing module classifies documents with unknown class labels, based on the class label structured vector models developed by the training module.

20. The software program product according to claim 12, wherein the structured vector model uses structured information embedded in the document schema and text content to develop the structured vector model.

21. A method for dynamically classifying a semi-structured document, comprising:

parsing the document into a structured vector model;

dividing the structured vector model into a tree of sub-vectors to reflect a plurality of hierarchical levels beginning with a root and ending with a plurality of leaves;

searching the document and counting the occurrences of individual terms in the document;

accounting for the frequency of occurrence of the terms at each hierarchical level to achieve a high contextual sensitivity;

assigning a class to the document by using a statistical model based on probability calculation to create a classification model; and wherein the classification model assigns a class to the document that maximizes a posteriori class probability $\Pr[c|d,F_k]$ according to the following expression:

$$Pr[c|d, F_k] = \frac{\pi(c) \prod_{t \in p_d(i,j), t \in d \cap F_k(e_d(i,j))} f(c, p_d(i, j), t)^{n(d,p_d(i,j),t)}}{\sum_{c'} \pi(c') \prod_{t \in p_d(i,\cdot), t \in d \cap F_k(e_d(i,j))} f(c', p_d(i, j), t)^{n(d,p_d(i,j),t)}}$$

where d is the document, p(c) is a prior distribution on the class c; c' is a class in a set of documents; $p_d$ is a path to a structure node $e_d$ from a root; n is a number of occurrences of term t in $p_d$, f is a maximum likelihood estimation; $F_k$ is a set of selected terms; F is a Fisher index defined by the following equation, where $c_1$ and $c_2$ are children of an internal class $c_0$, and m is an average number of an occurrence of term t in class c:

$$F(t) = \frac{\sum_{c_1,c_2}(\mu(c_1, t) - \mu(c_2, t))^2}{\sum_c \frac{1}{|c|}\sum_{d \in c}(f(t, d, c) - \mu(c, t))^2}.$$

22. The method according to claim 21, wherein counting the occurrences includes storing the frequency of occurrence of the terms in separate histogram bins.

23. The method according to claim 21, wherein accounting for the frequency of occurrence of the terms includes storing the frequency of occurrence of the terms in separate histogram bins.

24. The method according to claim 21, further including normalizing the frequency of occurrence of the terms at each hierarchical level.

25. A method for dynamically classifying a semi-structured document, comprising:

parsing the document into a structured vector;

organizing the structured vector into a tree comprised of any of sub-vectors or structured vectors, to reflect a plurality of hierarchical levels in the document, beginning with a root and ending with a plurality of leaves;

searching the document and counting the occurrences of individual terms in the document;

accounting for the frequency of occurrence of the terms at each hierarchical level to achieve a high contextual sensitivity;

assigning a class to the document based on both term frequency and term distribution information and structure within the structured vector of the document, by using a statistical model based on probability calculation to create a classification model; and wherein the classification model assigns a class to the document that maximizes a posteriori class probability $\Pr[c|d,F_k]$ according to the following expression:

$$Pr[c|d, F_k] = \frac{\left(\pi(c) \prod_{t \in p_d(i,j), t \in d \cap F_k(e_d(i,j))} f(c, p_d(i, j), t)^{n(d,p_d(i,j),t)}\right)}{\left(\sum_{c'} \pi(c') \prod_{t \in p_d(i,\cdot), t \in d \cap F_k(e_d(i,j))} f(c, p_d(i, j), t)^{n(d,p_d(i,j),t)}\right)}$$

where d is the document, p(c) is a prior distribution on the class c; c' is a class in a set of documents; $p_d$ is a path to a structure node $e_d$ from a root; n is a number of occurrences of term t in $p_d$, f is a maximum likelihood estimation; $F_k$ is a set of selected terms; F is a Fisher index defined by the following equation, where $c_1$ and $c_2$ are children of an internal class $c_0$, and m is an average number of an occurrence of term t in class c:

$$F(t) = \frac{\sum_{c_1,c_2}(\mu(c_1, t) - \mu(c_2, t))^2}{\sum_c \frac{1}{|c|}\sum_{d \in c}(f(t, d, c) - \mu(c, t))^2}.$$

26. The method according to claim 25, wherein the leaves include textual terms.

* * * * *